United States Patent
He

(10) Patent No.: US 7,319,846 B2
(45) Date of Patent: Jan. 15, 2008

(54) COLORED INTERFERENCE IDENTIFICATION

(75) Inventor: Shousheng He, Sandby (SE)

(73) Assignee: Telafonaktiebolaget LM Ericsson(publ), Stockholm (SE)

( * ) Notice: Subject to any disclaimer, the term of this patent is extended or adjusted under 35 U.S.C. 154(b) by 73 days.

(21) Appl. No.: 10/514,933

(22) PCT Filed: May 16, 2003

(86) PCT No.: PCT/EP03/05167

§ 371 (c)(1),
(2), (4) Date: May 5, 2005

(87) PCT Pub. No.: WO03/100997

PCT Pub. Date: Dec. 4, 2003

(65) Prior Publication Data

US 2005/0227663 A1    Oct. 13, 2005

Related U.S. Application Data

(60) Provisional application No. 60/386,090, filed on Jun. 4, 2002.

(30) Foreign Application Priority Data

May 27, 2002    (SE)    .................... 0201561

(51) Int. Cl.
H04B 1/00    (2006.01)
H04B 15/00   (2006.01)

(52) U.S. Cl. ............... 455/63.1; 455/67.11; 455/67.13; 455/114.2

(58) Field of Classification Search ............... 455/63.1, 455/67.11, 67.13, 114.2, 115.1
See application file for complete search history.

(56) References Cited

U.S. PATENT DOCUMENTS

| | | | |
|---|---|---|---|
| 5,031,195 A | | 7/1991 | Chevillat et al. |
| 5,283,811 A | | 2/1994 | Chennakeshu et al. |
| 5,513,216 A | * | 4/1996 | Gadot et al. ................. 375/233 |
| 5,742,694 A | | 4/1998 | Eatwell |
| 5,905,743 A | | 5/1999 | Ramesh |
| 6,226,321 B1 | * | 5/2001 | Michels et al. ............. 375/227 |
| 6,282,286 B1 | * | 8/2001 | Reesor et al. .......... 379/406.05 |
| 6,732,075 B1 | * | 5/2004 | Omori et al. ................ 704/250 |
| 7,039,094 B2 | * | 5/2006 | Kim et al. ................... 375/147 |
| 2002/0034270 A1 | | 3/2002 | Ylitalo |
| 2002/0094043 A1 | * | 7/2002 | Chu et al. .................... 375/346 |

FOREIGN PATENT DOCUMENTS

| | | |
|---|---|---|
| WO | WO-01/39448 | 5/2001 |
| WO | WO-01/61950 | 8/2001 |

* cited by examiner

*Primary Examiner*—Matthew Anderson
*Assistant Examiner*—Tuan Pham
(74) *Attorney, Agent, or Firm*—Michael Cameron

(57) ABSTRACT

A method and apparatus for receiving a communication signal r(t) subject to noise n(t) over a communication channel (10) is disclosed. The method comprises the steps of: receiving (100) the communication signal r(t) comprising the noise n(t), estimating (103) the amount of noise n(t) in the communication signal r(t), and determining (105) the hue of the estimated amount noise n(t), wherein the received communication signal r(t) is passed through a whitening filter if the hue of the noise n(t) is greater than a predetermined threshold level.

16 Claims, 3 Drawing Sheets

COLORED INTERFERENCE IDENTIFICATION

This patent application claims the benefit of priority from U.S. Provisional Patent Application Ser. No. 60/386,090 filed on Jun. 4, 2002. This application incorporates by reference the entire disclosure of U.S. Provisional Patent Application Ser. No. 60/386,090.

TECHNICAL FIELD

Generally, the present invention relates to communication methods and apparatus, and more specifically to a method and apparatus for determining the hue of a noise component that is introduced in a communications signal when it is transferred through a wireless communications system.

DESCRIPTION OF THE PRIOR ART

Many different wireless communications systems have been employed in the recent years to provide voice and data communications to subscribers. A known standard for digital cellular mobile telephony is GSM (Global System for Mobile Service), which today covers a large part of the world. In the following GSM will be used as a basis for examples and discussion, but the description below may in all essential parts be applied also to other standards for mobile telephony, such as for instance D-AMPS (Digital Advanced Mobile Phone System) or PDC (Pacific Digital Cellular).

The performance of any communications system available today will be affected by the inevitable noise that arises from various sources. As is well known, thermal noise will be present in any electrical system due to e.g. the stochastic motion of electrons acting as charge carriers in the system. The result from the thermal activity of the electrons is generally known as "white noise".

The term "white" arises from the fact that the noise power is evenly distributed over the frequency spectrum, i.e. over a long period of time, the same amount of noise power is present in the range 0-10 kHz as in the range 100 kHz-110 kHz.

In addition to white noise, colored noise is also present in most electric systems today. The colored noise may arise from many different sources such as the metal-oxide-semiconductor junction in a field effect transistor (FET) which produces what is called pink noise or flicker noise. As will be described below, co-channel and adjacent channel interference in a communications system will also act as sources of colored noise.

The colored noise is characterized by an uneven distribution of noise power throughout the frequency spectrum. For example, pink noise has the same distribution of noise power for each octave, so the noise power between 10 kHz and 20 kHz is the same as between 100 kHz and 200 kHz. Many other forms of colored noise are defined and described throughout the literature, but they all exhibit the fundamental feature of an uneven noise power distribution.

In wireless communications systems, the background noise in the communications channel is normally white. However, the performance of these systems are not limited by the background noise only, but more by interference that arise from other users in the system. As is well known in the art, the multiple access scheme defines how different simultaneous communications between different mobile stations that are located in different cells, share the same radio spectrum. In case of GSM, a multiple access scheme in form of a mix of FDMA (Frequency Division Multiple Access) and TDMA (Time Division Multiple Access), has been adopted.

More specifically, in GSM, 124 carrier frequencies with a bandwidth of 200 kHz each forms a 25 MHz frequency band using a FDMA scheme. Each of the 124 carrier frequencies are then divided in time using a TDMA scheme. This scheme splits the radio channel, with a 200 kHz bandwidth, into eight bursts. A single user is then assigned one burst for communication.

For narrow band TDMA systems such as GSM, two types of interference are normally present. Users with the same carrier create co-channel interference, while users with adjacent carrier create adjacent channel interference. As mentioned above, noise due to co-channel and adjacent channel interference appears in a colored spectrum with a non-uniform distribution of noise power. Moreover, a receiver filter that is normally present at the input of the receiver, which is narrower than the Nyquist bandwidth can also make the background noise appear colored.

The colored noise significantly impairs the performance of a Most Likelihood Sequence Estimate (MLSE) equalizer present in the receiver, which is only optimal assuming that the present noise is White Gaussian Additive Noise (WGAN).

To combat performance degradation due to colored noise, a "whitening filter" can be introduced before the equalizer. In addition, unbiased channel estimation ("BLUE, best linear unbiased estimation")may also be necessary. Both whitening filter setting and unbiased channel estimation requires the knowledge of the noise characteristics which may be obtained by an initial estimation of the noise autocorrelation and the knowledge of the signal information (e.g. through the training sequence in GSM systems).

As mentioned above, whitening filter and unbiased channel estimation improve the performance of the equalizer considerably when the noise is strongly colored (i.e. the hue of the noise is high), such as when a strong adjacent channel interference exists. However, when the noise is close to white, the whitening filter and unbiased channel estimation will cause performance degradation, which can be significant under certain circumstances, such as in hilly terrain environment. This is because with a limited training sequence length, the estimation of the noise character can be deficient. At certain level of noise hue, the benefit of whitening will be outweighed by the impairment due to the deficiency of in the noise estimation. Further, the use of whitening filters and unbiased channel estimation will increase the computational burden put on the signal processing units in the system.

WO 0139448 A1 discloses a system for whitening a signal disturbance in a communication signal by using a filter which coefficients are adaptively established using known signal information in each burst of the received signal. In one embodiment disclosed in WO 0139448 A1, the received signal is processed through a whitening filter having M+1 taps, where M is a selected integer. The coefficients of the whitening filter are based on an M-th order linear predictor of the signal disturbance. Alternatively, the coefficients may be based on the autocorrelation of signal disturbance. The procedure for performing the whitening of the signal make heavy demands on the processor performing the calculation even if none or very little colored noise is present in the signal, since the whitening procedure is performed independent of the hue of the present noise.

U.S. Pat. No. 5,031,195 discloses an adaptive modem receiver comprising an adaptive whitened-matched filter (WMF). The WMF comprises an adaptive linear equalizer and an adaptive linear predictor. The coefficients of the predictor are updated so that the noise at the input of a subsequent sequence decoder is whitened regardless of whether the added noise from passage through the communication channel is correlated or not. No means are provided for reducing the computational burden even if the noise is white or very little colored.

U.S. Pat. No. 5,283,811 discloses a decision feedback equalizer that enhances the performance of a receiver when the transmitted signal is subject to multipath propagation which causes delay spread and inter-symbol interference as a consequence of this. In areas where the delay spread due to multipath propagation is low (i.e. less than one third of the symbol duration), the equalizer may be switched out of the circuit. However, no provisions are disclosed in U.S. Pat. No. 5,283,811 how to improve the performance of the receiver based on the coloration of the present noise due to e.g. adjacent channel interference.

US 2002/034720 discloses a method for removing coloured noise of a signal in wireless communication system. A signal comprising the noise is receimed and the amount of noise in the signal is estimated. However, the method disclosed suffers from the above mentioned drawbacks related to degraded performance of the sytem with received signals having white noise, adjacent channel and co-channel interference.

SUMMARY OF THE INVENTION

The present invention seeks to provide a method for improving the performance of a communication apparatus receiving a signal that is subject to noise arising from e.g. adjacent channel interference and co-channel interference.

This object has been achieved by a method for receiving a communication signal r(t) subject to noise n(t) over a communication channel comprising the steps of: 1) receiving (100) the communication signal r(t) comprising the noise n(t), 2) estimating (103) the noise power n(t) in the communication signal r(t), 3) determining (105) the hue of the estimated noise n(t), wherein the received communication signal r(t), is passed through a whitening filter if the hue of the noise n(t) is greater than a predetermined threshold level.

According to a preferred embodiment, the method is performed by a communication apparatus comprising: receiving circuitry (30, 40, 50) for receiving a communication signal r(t) subject to noise n(t) over a communication channel and a signal processing unit (60) adapted to: 1) estimating (103) the noise power n(t) in the communication signal r(t), 2) determining (105) the hue of the estimated noise n(t), and engaging (107) a whitening filter (80) if the hue of the noise n(t) is greater than a predetermined threshold level.

Other objects, features and advantages of the present invention will appear more clearly from the following detailed disclosure of a preferred embodiment.

BRIEF DESCRIPTION OF THE DRAWINGS

A preferred embodiment of the present invention will now be described with reference to the accompanying drawings, in which.

DETAILED DISCLOSURE OF A PREFERRED EMBODIMENT

Figure 1:
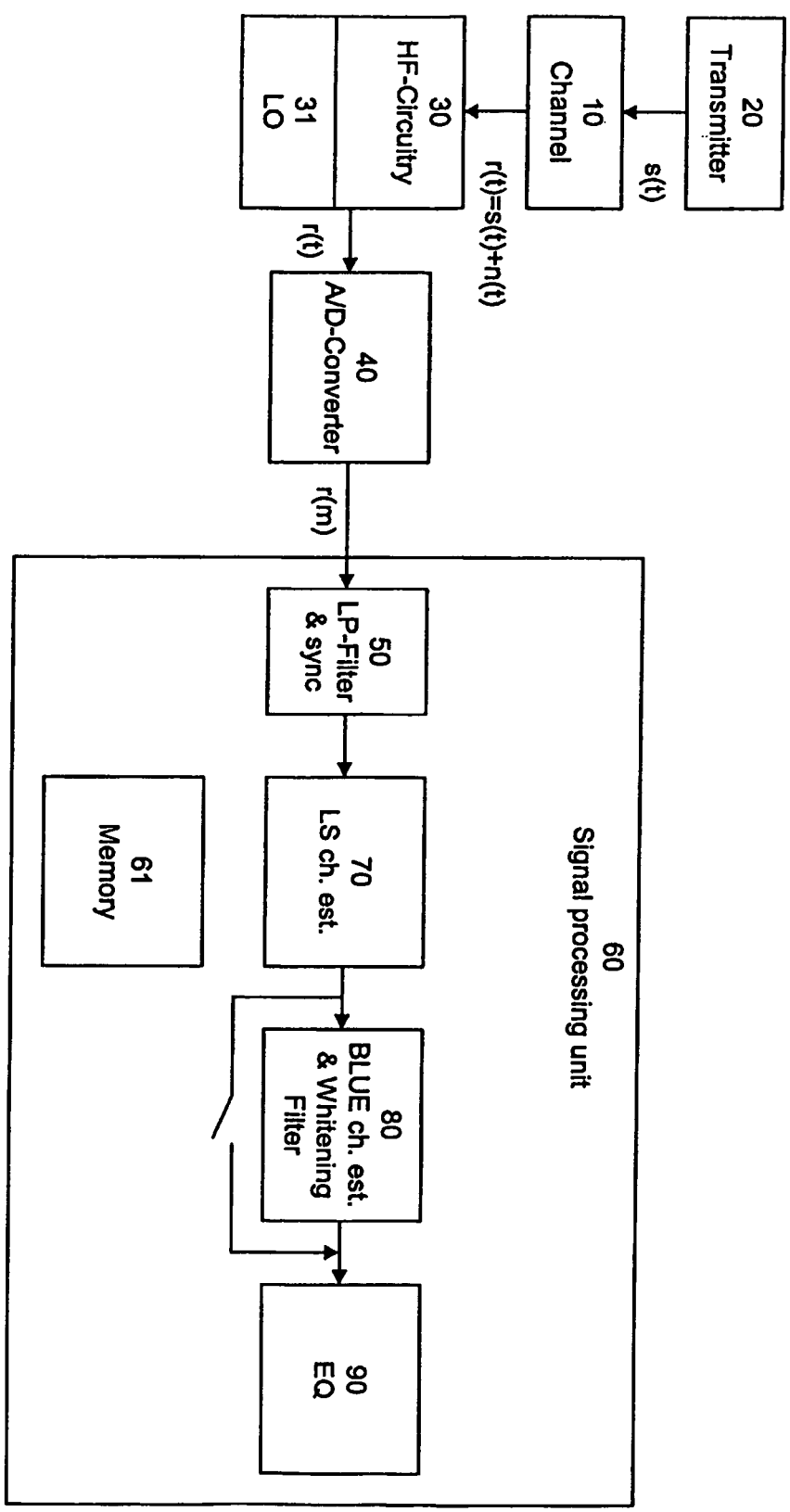
FIG. 1 is a schematic block diagram illustrating the different processing blocks according to a preferred embodiment.

FIG. 1 gives an overview of a receiver in a communications system according to a preferred embodiment of the present-invention. The information signal s(t) is transmitted over a communications channel 10 in the form of radio waves. The information-carrying medium is, however, of less importance for the function of the invention and the information may as well be transmitted by means of light, cable or any other suitable communications medium. For simplicity reasons, however, only communication by means of radio waves will be disclosed throughout this text.

Before being dispatched from the transmitter 20 in FIG. 1, the signal s(t) modulates a high frequency down link carrier, which in the case of GSM communication is in the range of 935-960 MHz. The output of the transmitter is hence a HF-signal (i.e. carrier envelope modulated by s(t)) that is suitable for transmission.

Irrespective of which communications medium that is selected for transmission of the information signal s(t), the signal s(t) will be altered in that disturbances n(t) associated with channel 10 characteristics will be introduced during transmission through the actual communications channel 10. The disturbances arise, as mentioned above, from many different sources, of which co-channel and adjacent channel interference is of major concern.

The HF-signal is received in the HF circuitry 30, which in a preferred embodiment operates according to the homodyne principle, and the received information signal r(t) is accordingly extracted from the received HF-signal by mixing the received HF-signal with a signal from a local oscillator 31. As is the case with signal modulation mentioned above, signal demodulation according to the homodyne or heterodyne principle is well known in the art and is readily found in the literature. However, any other suitable demodulation principle is possible within the scope of the invention.

After removal of the high frequency carrier, the received base band signal r(t) is transferred to an analog to digital converter (ADC) 40 for converting the analog signal r(t) into a time-discreet digital signal r(m). The sampled and converted signal r(m) is then, after filtering in a low-pass filter 50, received in a signal processing unit 60 which in a preferred embodiment is in form of a DSP (digital signal processor) that performs the steps disclosed below by executing program code being stored in a memory 61. The signal processing unit may however as well be realized in form e.g. a FPGA (Field Programmable Gate Array) or an ASIC (Application Specific Integrated Circuit).

The signal processing unit performs a first initial channel estimation after burst synchronization based on known signal information (i.e. the training sequence in case of GSM/EDGE) found in the received signal r(m). The received signal r(m) is compared to the expected symbol sequence in order to determine the noise samples n(m) according to the formula:

$$n_k = r_k - \sum_{i=0}^{M_s-1} h_i s_{k-1} \qquad (1)$$

The embedded training sequences are normally short in length. This implies that it is very difficult to determine the noise characteristics by analyzing the sequence in the time domain. In this case, the calculation of the autocorrelation of the noise n(t) is a powerful tool for obtaining information regarding the noise spectrum.

Generally, the estimation of the noise autocorrelation (assume zero-mean) is calculated from the estimated noise samples according to the formula:

$$\rho_k = \frac{1}{N} \sum_{i=0}^{N_s-k-1} n_i^* n_{i+k} \qquad (2)$$

where Ns is the number of estimated noise samples and where ()* denotes complex conjugate. Noise autocorrelation is in general a complex, conjugate-symmetrical sequence so that the negative indexed elements can be obtained from the positive indexed part, $\rho_{-k}=\rho^*$. From the above equation, $\rho_0$ is always a real element.

Figure 2A:
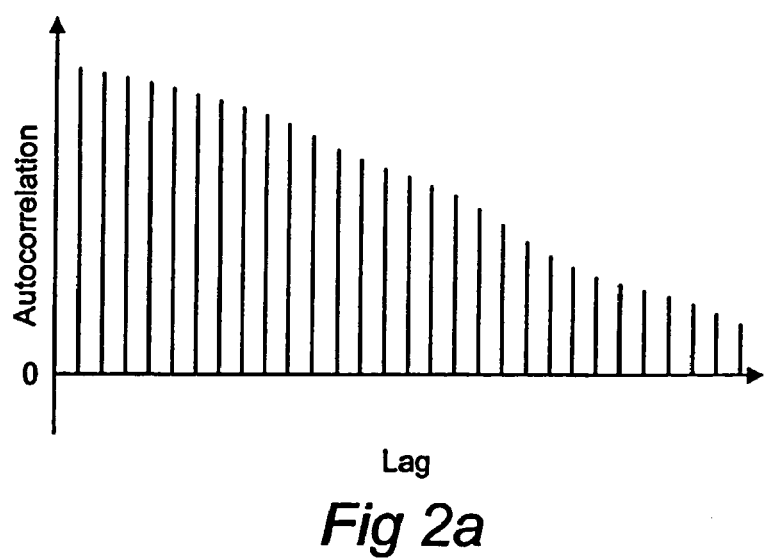
FIG. 2a is a schematic graph illustrating the result from calculating the autocorrelation of an information sequence r(m)

FIG. 2a illustrates the result from calculating the autocorrelation of an information sequence r(m). As is seen from FIG. 2a, the result of the autocorrelation is a vector, in this case presented as a graph, with its center at the Y-axis (i.e. zero lag), and which then decays towards zero as the lag increases (or the lead increases in case future signal values are known). Consequently, the information sequence shows a high degree of autocorrelation between adjacent and near-adjacent samples.

Figure 2B:
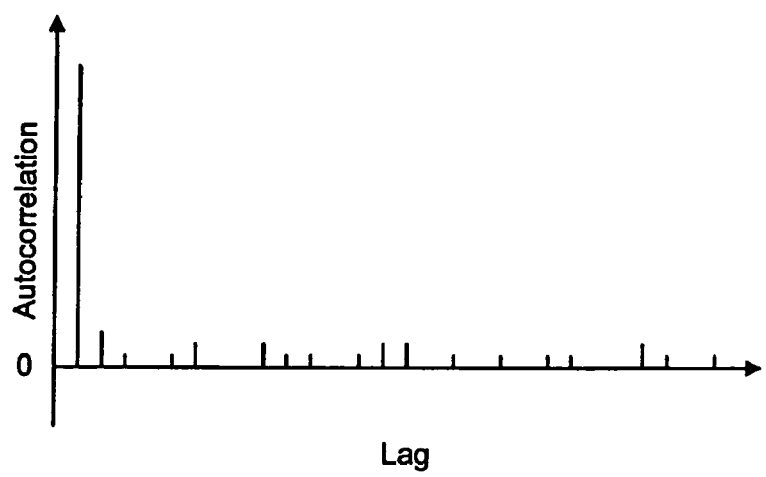
FIG. 2b is a schematic graph illustrating the result from calculating the autocorrelation of white noise.
Figure 2C:
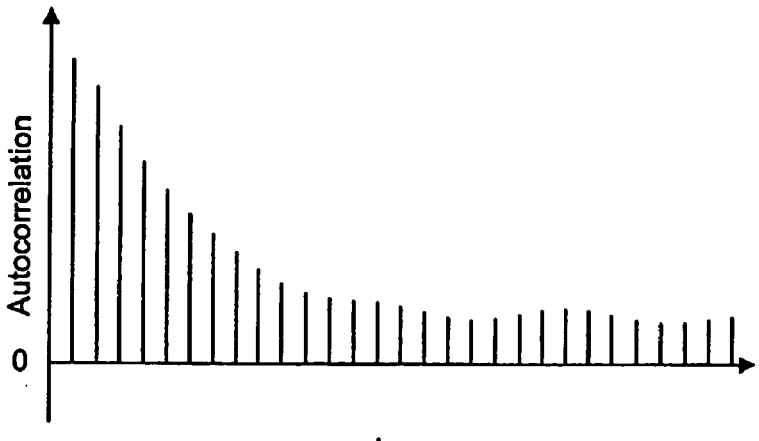
FIG. 2c is a schematic graph illustrating the result from calculating the autocorrelation of colored noise.

In case there were no information signal present, i.e. the signal comprises noise n(m) only, as seen in FIG. 2b, the autocorrelation is almost zero for every lag (except for lag=0, which is always 1 by definition) and without any dominant peaks as found in FIG. 2a FIG. 2c illustrates an autocorrelation of the noise n(m) in the case where it is not white and uniformly distributed over the spectrum but rather colored in the sense that the noise power is higher at some parts of the spectrum. This happens, e.g. in channels with strong adjacent channel interference. As can be seen from FIG. 2c, the colored noise shows a degree of autocorrelation since the output from the autocorrelation calculation is non-zero and decaying for lags other than zero. A stronger coloration of the noise (i.e. a higher hue value) will result in an output from the autocorrelation calculation that has higher values for lags other than zero than a weak colored signal disturbance.

The signal processing unit 60 then determines the center of gravity of the autocorrelation function according to the formula:

$$\sigma = \frac{\sum_{k=0}^{N_s-1} (k+1)|\rho_k|^2}{\sum_{k=0}^{N_s-1} |\rho_k|^2} \qquad (3)$$

Note that in a preferred embodiment, the formula uses the term k+1 instead of k in the numerator to preserve the weight of the first and most important element in the noise autocorrelation. However, other functions for determining the center of gravity for a function may as well be used.

The stronger colored the noise is, the higher value for the result of the calculation of the center of gravity σ will be obtained. This is a consequence of the fact that a noise signal with a strong coloration will result in an autocorrelation with high values for lags other than zero and that the center of gravity is calculated for one side of the autocorrelation only, i.e. only autocorrelation values to the right of the Y-axis are taken into consideration.

The hue of the noise can thus be determined by a single variable σ. A threshold can then be set according to N and s to switch on/off the whitening filter/unbiased estimation. In practice, for example, it is found that for GSM/EDGE, with a training sequence of 26 symbols in a normal burst, a threshold can be experimentally set as:

$\sigma_T = 1+s$

Note that the threshold is not proportional to the oversampling rate in this case.

If σ is less than $\sigma_T$, the noise is considered white and the whitening filter and the unbiased estimation (BLUE) 80 are bypassed by a colored interference identification block. Instead a much simpler least square estimation 70 can be used to estimate the channel impulse response. This will reduce the need for computational power in the signal processing unit 60 which in turn makes it possible to reduce the system clock frequency of the signal processing unit 60 by use of e.g. PLL-techniques. As is well known, reducing the clock frequency of an electronic system will also reduce the power consumption of the system. For a given battery capacity, the system will hence be operational for a longer time.

On the other hand, if the threshold σ is greater than $\sigma_T$, the noise is not white wherein the unbiased channel estimation and the whitening filter 80 are introduced before the equalizer 90.

Figure 3:
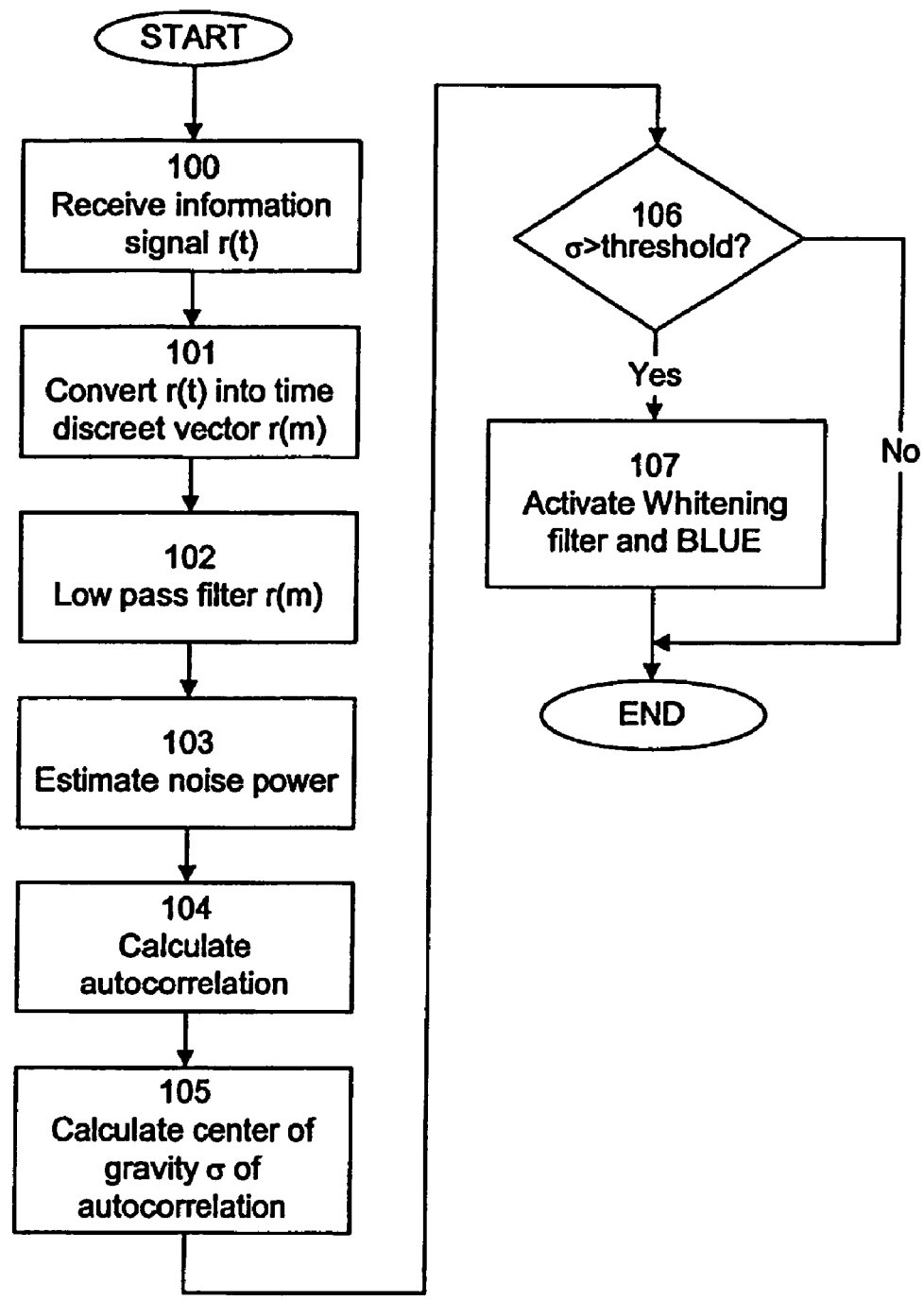
FIG. 3 is a schematic flow chart illustrating the steps for determining the hue of a noise disturbance in a signal according to a preferred embodiment.

FIG. 3 illustrates a flowchart for determining the hue of the noise n(m). The procedure starts in step 100 with the reception of the base band signal corresponding to the training sequence. As mentioned above, it is understood in this context that the information signal r(t) normally is obtained by demodulating a HF-signal. Regardless of the what transmission procedures that may have preceded the reception (i.e. any HF modulation-demodulation procedures normally performed when transmitting a signal), the received base band signal comprises both the expected training sequence s(t) through the propagation channel as well as noise n(t).

Before further processing, the signal is converted into a time-discreet digital signal r(m) by an Analog to Digital converter (ADC) in step 101. The ADC is normally of an over-sampling type (i.e. the signal is sampled more than twice the highest frequency component in the signal) but may as well be of a Nyquist-type (i.e. the signal is sampled twice the highest frequency component in the signal).

The A/D-converted signal r(m) is low pass-filtered in step 102 before being transferred to the Signal processing unit 60 where a first estimation of the noise power n(m) is performed in step 103. As described above, this is possible due to a known signal sequence (i.e. the training sequence in GSM) found in the received signal r(m). Since the training sequence will be distorted by the channel characteristics (i.e. noise is added, e.g. multi path and additive interference), it is possible to determine the noise in the signal from comparing the received signal r(m) with the known training sequence.

An autocorrelation of the estimated noise signal n(m) is calculated in step 104. The autocorrelation will reveal the frequency characteristics of the noise signal even if the signal is very short in length. Most digital signal processors (DSP) available today are adapted to perform autocorrelation calculations in an efficient way which implies that the autocorrelation calculation is not a major burden from a processing point of view.

In step 105 the center of gravity a of the autocorrelated noise is calculated according to equation 3. If the hue of the noise n(m) is low, the center of gravity will be located close to lag=0 since the energy at lags<>0 is very low, as is seen in FIG. 2b. However, if the hue is increasing due to e.g. adjacent channel interference, the center of gravity will be pushed further away from the Y-axis as is seen in FIG. 2c.

The signal-processing unit 60 determines in step 106 if the center of gravity $\sigma$ is above a preset threshold $\sigma_T$ which may be based on empirical as well as mathematical grounds.

If the center of gravity $\sigma$ is above the threshold level $\sigma_T$, the signal-processing unit 60, via the colored interference identification block, activates the whitening filter 80 and the unbiased channel estimation in step 107.

It is appreciated that the whitening filter/unbiased channel estimation 80 may be performed by the signal processing unit 60 itself, by a separate DSP, by a fixed logic such as a FPGA (Field Programmable Gate Array) or by an ASIC (Application Specific Integrated Circuit). The whitening filter will then provide a signal with less coloration to the equalizer (or demodulator) 90, which in turn will increase the equalizer performance since the equalizer assumes that the disturbances introduced by the channel are white.

If, however, the center of gravity $\sigma$ is below the threshold $\sigma_T$, the whitening filter is not activated since the noise is considered white. An application of the whitening filter on a signal comprising white noise will not only increase the computational burden as described above, but will in most cases also lower the efficiency of the decoding procedure in the equalizer 90. Instead the whitening filter and the unbiased channel estimation is bypassed.

The present invention has been described above with reference to a preferred embodiment. However, other embodiments than the one disclosed herein are possible within the scope of the invention, as defined by the appended independent claims.

The invention claimed is:

1. A method for receiving a communication signal r(t) subject to a noise n(t) over a communication channel comprising the steps of:
   receiving the communication signal r(t) comprising the noise n(t),
   estimating the amount of noise n(t) in the communication signal r(t), and
   determining the hue of the estimated amount of the noise n(t),
   comparing the hue of the estimated amount of noise n(t) to a predetermined threshold, and
   passing the received communication signal r(t) through a whitening filter if the hue of the noise n(t) is greater than a predetermined threshold level or
   bypassing said whitening filter if the hue of the noise n(t) is lower than said predetermined threshold level.

2. A method according to claim 1, wherein said noise n(t) is estimated by means of comparing the received signal r(t) with known signal information.

3. A method according to claim 1 or 2 wherein frequency characteristics of the noise n(t) is determined by performing an autocorrelation of the noise n(t).

4. A method according to claim 3, wherein the hue of the noise n(t) is determined by determining the center of gravity .sigma. of the noise autocorrelation sequence.

5. A method according to claim 4, wherein said noise hue is determined by a single variable.

6. A method for receiving a communication signal r(t) subject to a noise n(t) over a communication channel comprising the steps of:
   receiving the communication signal r(t) comprising the noise n(t),
   estimating the amount of noise n(t) in the communication signal r(t), and
   determining the hue of the estimated amount of the noise n(t),
   comparing the hue of the estimated amount of noise n(t) to a predetermined threshold, and
   passing the received communication signal r(t) through a whitening filter if the hue of the noise n(t) is greater than a predetermined threshold level or
   bypassing said whitening filter if the hue of the noise n(t) is lower than said predetermined threshold level,
   wherein the hue of the noise n(t) is determined by determining the center of gravity sigma of the noise autocorrelation sequence, according to the formula:

$$\sigma = \frac{\sum_{k=0}^{Ns-1}(k+1)|\rho|^2}{\sum_{k=0}^{Ns-1}|\rho|^2}.$$

7. A method according to claim 1, wherein the threshold level engages an unbiased channel estimation.

8. A communication apparatus comprising:
   receiving circuitry for receiving a communication signal r(t) subject to a noise n(t) over a communication channel;
   a signal processing unit adapted to estimate the amount of noise n(t) in the communication signal r(t);
   determine the hue of the estimated amount of noise n(t);
   compare the hue of the estimated amount of noise n(t) to a predetermined threshold;
   pass the received communication signal r(t) through a whitening filter if the hue of the noise n(t) is greater than a predetermined threshold level or
   bypass said whitening filter if the hue of the noise n(t) is lower than said predetermined threshold level.

9. An apparatus according to claim 8, wherein the signal processing unit is adapted to estimate the noise n(t) by means of comparing the received signal r(t) with known signal information.

10. An apparatus according to claim 8 or 9, wherein the signal processing unit is adapted to determine the frequency characteristics of the noise n(t) by performing an autocorrelation of the noise n(t).

11. An apparatus according to claim 10, wherein the signal processing unit is adapted to determine the hue of the noise n(t) by determining the center of gravity .sigma. of the noise autocorrelation sequence.

12. An apparatus according to claim 11, wherein the signal processing unit is adapted to determine the noise hue by a single variable.

13. A communication apparatus comprising:
receiving circuitry for receiving a communication signal r(t) subject to a noise n(t) over a communication channel;
a signal processing unit adapted to: estimate the amount of noise n(t) in the communication signal r(t);
determine the hue of the estimated amount of noise n(t);
compare the hue of the estimated amount of noise n(t) to a predetermined threshold;
pass the received communication signal r(t) through a whitening filter if the hue of the noise n(t) is greater than a predetermined threshold level or
bypass said whitening filter if the hue of the noise n(t) is lower than said predetermined threshold level;
wherein the signal processing unit is adapted to:
estimate the noise n(t) by means of comparing the received signal r(t) with known signal information;
determine the frequency characteristics of the noise n(t) by performing an autocorrelation of the noise n(t); and
determine the hue of the noise n(t) by determining the center of gravity .sigma. of the noise autocorrelation sequence, according to the formula:

$$\sigma = \frac{\sum_{k=0}^{N_s-1}(k+1)|\rho|^2}{\sum_{k=0}^{N_s-1}|\rho|^2}.$$

14. An apparatus according to claim 8, wherein the signal processing unit is adapted to engage an unbiased channel estimation if the hue of the noise n(t) is greater than a predetermined threshold level.

15. An apparatus according to claim 8, wherein the signal processing unit is a digital signal processor (DSP).

16. A computer program product comprising:
program code embodied on a computer readable medium directly loadable into an internal memory associated with a processor, said processor being operatively coupled to receiving circuitry for receiving a communication signal r(t) subject to a noise n(t) over a communication channel, the program code further adapted to:
estimate the amount of noise n(t) in the communication signal r(t);
determine the hue of the estimated amount of noise n(t);
compare the hue of the estimated amount of noise n(t) to a predetermined threshold;
if the hue of the noise n(t) is greater than a predetermined threshold level, pass the received communication signal r(t) through a whitening filter or
if the hue of the noise n(t) is lower than said predetermined threshold level when executed by said processor, bypass said whitening filter.

* * * * *

UNITED STATES PATENT AND TRADEMARK OFFICE
CERTIFICATE OF CORRECTION

PATENT NO.       : 7,319,846 B2
APPLICATION NO.  : 10/514933
DATED            : January 15, 2008
INVENTOR(S)      : He It is certified that error appears in the above-identified patent and that said Letters Patent is hereby corrected as shown below:

In Column 6, Line 60, delete "AID" and insert -- A/D --, therefor.

In Column 7, Line 12, after "gravity" delete "a" and insert -- σ --, therefor.

In Column 8, Line 26, in Claim 6, delete "sigma" and insert -- .sigma. --, therefor.

Signed and Sealed this

Thirtieth Day of September, 2008

JON W. DUDAS
*Director of the United States Patent and Trademark Office*